April 10, 1934.  P. SCHLUMBOHM  1,954,184

OPTICAL DEVICE

Filed Sept. 24, 1932

Inventor:

Patented Apr. 10, 1934

1,954,184

UNITED STATES PATENT OFFICE 1,954,184

OPTICAL DEVICE

Peter Schlumbohm, Berlin, Germany

Application September 24, 1932, Serial No. 634,744
In Germany October 3, 1931

4 Claims. (Cl. 2—14)

The present invention relates to optical devices for shielding the eye from excessive light and is preferably embodied in the form of spectacles.

The object of my invention is to increase the seeing capacity of the human eye in such cases where the picture to be focused is surrounded by objects highly illuminated. I point out the difference between the subjective light-value and the objective light-value of the object from which light radiates to the human eye. While the objective light-value depends on the intensity of the source of the primary light and could, of course, be augmented only by using a stronger source of the primary light, the subjective light-value, however, can be increased without using a stronger source of the primary light. The subjective light value depends upon the circumstances under which the object is viewed. Light coming from the surroundings of the object, reduces the sensibility of the human eye with regard to the rays coming from the object itself.

It is the object of my invention to create a device, by means of which the human eye can receive fully all the light which comes from the object, while the light coming from the surroundings of the object, is screened off. The object of my invention differs entirely from known protective binoculars, in which light admitting apertures, smaller than the pupil of the human eye, are used for the specific purpose of reducing the quantity of light reflected from the object itself into the human eye. In contrast to those devices, the object of my invention is particularly characterized by the fact that the pupil of the human eye can freely see the object, and can fully take in the entire quantity of light coming from the object.

I accomplish my objects by that certain construction and arrangement of parts to be hereinafter more specifically pointed out and in which I show and describe the method best known of accomplishing my objects, the novelty therein to be set forth in the appended claims.

Arrangements of the invention are shown in the accompanying drawing with Figures 1 to 8.

Figure 4:
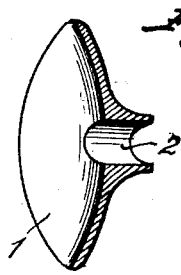
Fig. 4 is a cross-section of Fig. 3.
Figure 6:
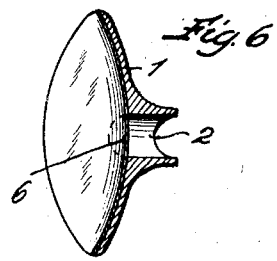

Fig. 6 corresponds to Fig. 4, supplemented by a sheet of organic glass, at the rear of the device.

Figure 7:
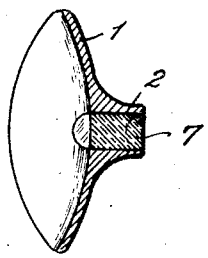

Fig. 7 also corresponds to Fig. 4, in addition showing a protecting glass plate.

Figure 8:
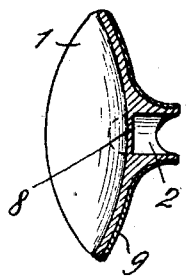

Fig. 8 differs from Fig. 4 in that the moulded piece is made out of organic glass, allowing the eye to see through one part of the wall, together with a cover of non-transparent varnish on the other parts of the walls.

The object of my invention is characterized by a short tube 2 which together with its plate-base 1 forms a screen for the range of vision, without limiting the free seeing of the pupil and is constructed so as to form a horizontal slit tube with an inside width greater than the diameter of the human pupil, this horizontal slit tube being placed before the eye, on the level of its center of rotation and being broad enough to permit of lateral movements of the eye. As the diameter of the human pupil in middle light is about 4 mm. I prefer to choose a slit tube with an inside width of 5 to 10 mm.

Figure 1:
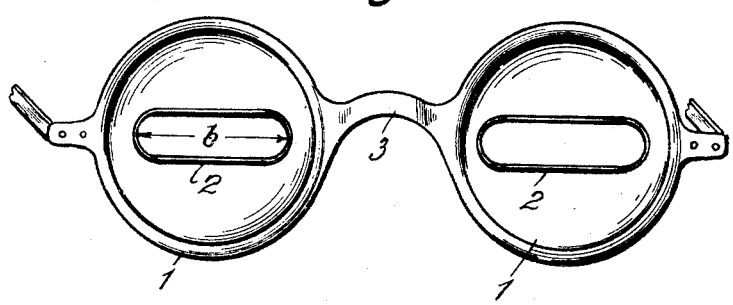
Fig. 1 shows the invention as an improvement of the normal construction of binoculars.
Figure 2:
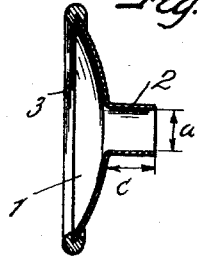
Fig. 2 is a cross-section of the one-half of Fig. 1.

In Figs. 1 and 2, in a normal eye-glass frame 3 the glasses are replaced by a pressed metal piece which with its parts 1 and 2 forms the screen for the range of vision. The slit tube 2 has a latitude $b$ as broad as possible, while the length $c$ corresponds about to its inside width $a$.

Figure 3:
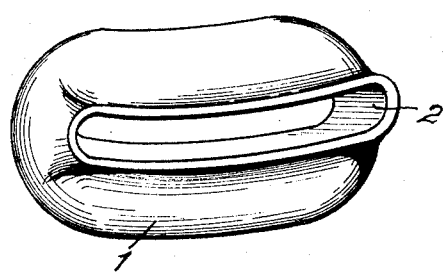
Fig. 3 shows a device, made as a moulded piece, each eye being equipped with such device.

In Figs. 3 and 4 the two parts 1 and 2 are moulded in one piece, example given out of bakelite. Following my invention this moulded piece which is to be placed before one eye, and an identical moulded piece before the second eye, both pieces being supported by known means in the usual style of spectacles or goggles, is curved especially with a radius of 85 mm., to be inserted in standard curved goggle frames. The latitude of the slit tube 2 is broader than in Fig. 1, corresponding to the full angle of the turning eye.

Figure 5:
Fig. 5 is a view from above of the moulded piece of the type of Fig. 3, provided with a slit which keeps a protecting flexible strip of organic glass in its vertical position.

In Fig. 5 to Fig. 8 various additional protecting supplementary parts are illustrated which have no connection with the optical function of the device, but the purpose of which is only to protect the eye against mechanical attacks, for instance, against the intruding of insects through the slit tube 2. In Fig. 5, a strip 5 of flexible organic glass is illustrated as being held in its vertical position in the slit 2 by the slit 4. In Fig. 6 a sheet of organic glass 6 is attached at the rear of the plate base 1. In Fig. 7 the slit tube 2 is filled out with a plate of glass 7, which is cut exactly according to the inside dimensions of the tube 2. In Fig. 8 the moulded piece forming the parts 1 and 2 of the device, is made out of organic glass or the like, and differs from the mentioned forms, in that the wall of the plate base 1 is not interrupted at the joining point with the tube 2. Thus at this part the eye can look through the wall 8. A colored or a non-transparent varnish 9 covers the outside surface of the parts 1 and 2.

The technical effect of the new device which appears to be very simple, is surprisingly favourable. The new device can be used to great advantage by audiences of sporting events, theatrical performances and moving pictures. By using the described device, the wearer is no longer disturbed by side-light effects as coming from the sky, the sun or from highly illuminated backgrounds, as these side lights are screened off. Thus the full sensibility of the eye is reserved for the light coming from the object actually focused, and owing to these improved psychological conditions, the seeing capacity of the eye can be claimed to be considerably increased.

Having thus described my invention and the manner of its operation what I claim as new and desire to secure by Letters Patent is:

1. An eye shield comprising a diaphragm over each eye, each diaphragm being provided with a horizontal slot disposed on the level of the center of rotation of the eye and with a forwardly projecting tube in registry with said slot, the height of the slot and corresponding diameter of the inside of the tube being larger than the normal diameter of the pupil of the eye and the lateral length of the slot and the corresponding diameter of the inside of the tube being sufficient to give lateral vision with the upper and lower inside walls of the tube disposed substantially parallel to each other, the forward length of the tube being sufficient to augment the subjective intensity of a viewed object by creating a field stop.

2. An eye shield as claimed in claim 1 in which the height of the slot is about 5 mm. to 10 mm.

3. An eye shield as claimed in claim 1 in which the height of the slot is about 5 mm. to 10 mm., and in which the length of the tube is substantially equal to the height of the slot.

4. An eye shield comprising a diaphragm over each eye, said diaphragm being formed of a transparent material and having a forwardly extending flattened opaque tube rigidly attached thereto and located on the level of the center of rotation of the eye and formed with a larger inside vertical diameter than the normal diameter of the pupil of the eye and of sufficient lateral inside diameter to give lateral vision with the upper and lower inside walls thereof disposed substantially parallel to each other, all of the diaphragm except that in registry with the opening in the tube being opaque whereby the subjective intensity of a viewed object is augmented and a field stop is created.

PETER SCHLUMBOHM.